United States Patent [19]

Rose

[11] Patent Number: 4,850,013
[45] Date of Patent: Jul. 18, 1989

[54] TELEPHONE CALL SCREENING APPARATUS

[76] Inventor: H. Barry Rose, 8585 O'Hare Rd., Las Vegas, Nev. 89131

[21] Appl. No.: 201,746

[22] Filed: Jun. 3, 1988

Related U.S. Application Data

[63] Continuation-in-part of Ser. No. 59,772, Jun. 8, 1987, abandoned.

[51] Int. Cl.⁴ .............................................. H04M 1/66
[52] U.S. Cl. ..................................... 379/199; 379/373
[58] Field of Search .............. 379/199, 188, 373, 375, 379/386, 283, 280, 281, 282, 287, 350, 353

[56] References Cited

U.S. PATENT DOCUMENTS 4,266,098  5/1981  Novak ................................... 379/77
4,446,334  5/1984  Groff ............................. 379/373 X Primary Examiner—James L. Dwyer
Attorney, Agent, or Firm—Jack C. Munro

[57] ABSTRACT

An apparatus to be connected in combination with a conventional telephone receiver and its circuit which prevents the telephone receiver from being activated (ringing) until a preselected code is supplied into the telephone circuit by the calling party.

6 Claims, 3 Drawing Sheets

TELEPHONE CALL SCREENING APPARATUS

BACKGROUND OF THE INVENTION

Reference to prior application: This application is a continuation-in-part of United States patent application Ser. No. 059,772, filed June 8, 1987 now abandoned by the same title and same inventor.

The field of this invention relates to an attachment for a signal receiver and more particularly to an attachment for a telephone which permits ringing of the telephone only when a particular code is entered by the calling party.

In the normal daily lives of most people, the telephone is probably the invention that has the greatest effect. In this day and age, the telephone allows virtually the entire planet to be linked with our own personal telephone. Although, at times it is desirable, at other times this is not desirable. With the telephone comes a ringing announcing to the user that someone is calling and the user is then required to pick up the phone. Some calls are wrong numbers. Other calls are people to whom the user does not wish to have a conversation. And probably the most annoying are solicitors and salesman who are trying to get the individual answering the phone to purchase goods or services or give to a charity.

In the past, in order to avoid answering undesirable calls, it has been common to utilize an unlisted number. Although an unlisted number may be affective in not receiving telephone calls from individuals whom you would wish not to speak with, the unlisted number is not particularly affective against solicitors or salesman. Solicitors and salesmen, are sufficiently enterprising to have found ways to discover such unlisted numbers.

Another way to avoid undesirable telephone calls is through the usage of the modular plug in connection with the telephone. This permits the user to "pull the plug" thereby physically disconnecting the phone. Although this method certainly eliminates receiving undesirable calls, it also eliminates receiving wanted calls.

Another way that is currently being utilized to receive only desirable calls is through the use of a telephone answering machine. By the use of the machine, the user can screen the call and call back only the calls the user wishes to return. The disadvantage of this system is that the call must be returned and therefore becomes an additional expense to the user, especially if it is a non-local call. To avoid this returning of calls, some answering machines allow the user to monitor the incoming calls through a speaker and the user can then immediately disable the answering machine if the user desires to answer a particular call. The disadvantage to this system is that the user must physically remain near the answering machine in order to monitor the incoming calls.

In the past, there has been an additional alternative to the receiving of undesirable calls. This has been provided in the form of requiring the caller to supply some additional code in order to effect ringing of the telephone. This additional code can be in the form of additional numbers being activated by the caller over his telephone or can be in the form of a noise supplied over the telephone line after the call has been initially received at the calling station. It is probably this type of device that has been found to be most successful toward culling out undesirable telephone calls.

In the past, the apparatuses that have been designed and utilized to cull out undesirable telephone calls have been relatively complex in construction and therefore inherently expensive to manufacture and sell. There is a need for the constructing of such a telephone attachment inexpensively and therefore sold at an inexpensive price.

SUMMARY OF THE INVENTION

The primary objective of the present invention is to provide an electronic telephone number coding device which when connected within the telephone line adjacent the telephone requires that a special telephone numbered code be dialed by the caller before the telephone user is notified of an incoming call.

Another objective of the present invention is to provide a coding device which permits for easy and quick changing of the special code at the user's discretion.

Another objective of the present invention is to provide a telephone attachment which can be quickly and easily attached to the telephone line which does not interfere or in any way affect the normal operation of the telephone.

Another objective of the present invention is to construct an attachment for a telephone wherein this attachment can be deactivated at any particular time the user so wishes, thus permitting the normal telephone operation.

The apparatus of the present invention is to be supplied energy from a source, either from a battery or conventional household current. The apparatus is to be placed within the telephone line just prior to the telephone receiver. Within the apparatus is located an extension of the telephone line. In parallel with that line, there is located a detector which is activated upon an incoming call being received. This detector, in turn, activates an off-hook simulating circuit and a telephone receiver monitoring circuit. The function of the telephone receiver monitoring circuit is that if the telephone receiver is activated ("turned on") so that the incoming call can be heard, the telephone receiver monitoring circuit will immediately deactivate this apparatus. The function of the off-hook simulating circuit is to give the appearance to the telephone equipment, through which the telephone call is being transmitted, that the telephone receiver has been taken to an off-hook condition even though it has not. The reason for this is so that the ringing signal will cease to be transmitted to the receiver. A timer circuit is also activated with this timer circuit having been preset to a certain time interval. At this time, the apparatus is ready to receive the additional code that is required in order to complete transmission of the incoming call. If there is no code supplied after a certain preset time interval, the timer circuit will cause the incoming call to be terminated. If an additional code is supplied, a signal will be produced from a decoder. This signal from the decoder is supplied to a comparator circuit which attempts to match that code to a previously supplied input code. If the no match occurs, after the expiration of the preset amount of time within the timer circuit, the timer circuit will terminate the phone call. If a match does occur, an output signal will be produced from the comparator circuit which will reset the timer preventing terminating of the incoming call and at the same time cause activation of a ringing circuit to make it known to the user that a call with the correct code is being received.

The telephone receiver can then be activated to receive the telephone call in the normal manner.

DETAILED DESCRIPTION OF THE SHOWN EMBODIMENT

Figure 1:
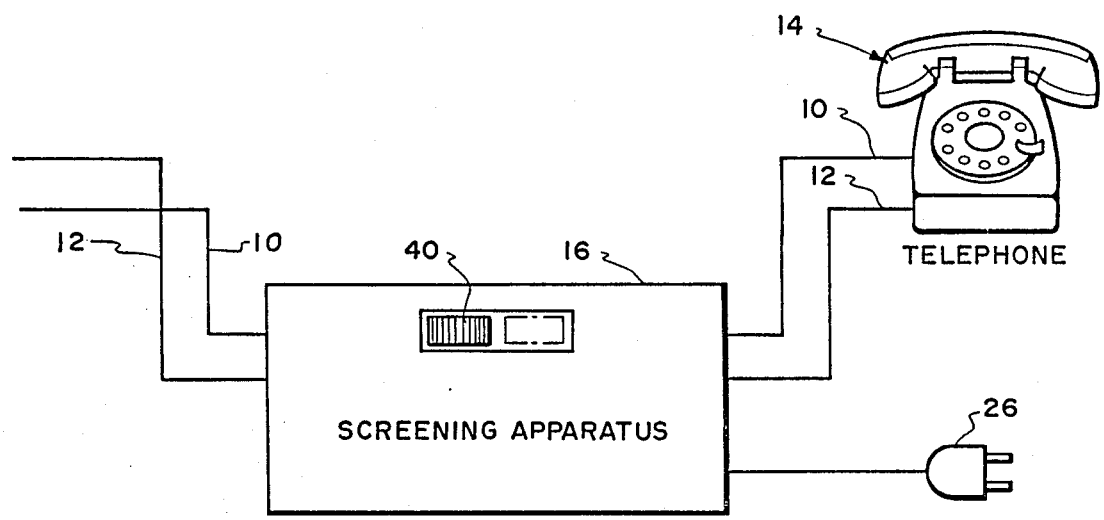
FIG. 1 is a general schematic view of the apparatus of the present invention showing such being connected in conjunction with a conventional telephone receiver.

Referring particularly to the drawings, there is shown in FIG. 1 a conventional telephone line formed of electrically conducting wires 10 and 12 which are to connect from the calling party (not shown) to a conventional telephone receiver 14. The apparatus 16 of this invention is to be electrically connected in parallel with conductors 10 and 12. The apparatus 16 is to be supplied a source of electrical power from a conventional plug-in type of electrical connector 26. This electrical power is to be supplied to locations 28, 30, 32, 34, 36 and 38 on the circuit diagram of FIG. 2. It is to be understood that the apparatus 16 will be located within an attractive housing (not shown). The physical size of the housing will normally be relatively small.

The user is to be capable to completely disconnect the apparatus 16 from the telephone line formed of conductors 10 and 12. In order to achieve this type of disconnection there is mounted on the apparatus 16 a switch 40. The switch 40 is shown in the open position meaning that the apparatus 16 is shown to be in operation in conjunction with the telephone line. In this particular position a resistor 42 is placed within the conductor 12. It is the function of the resistor 12 to prevent the normal calling signal being conducted through conductor 10 to activate the ringer located within the telephone 14. It is to be understood that the ringing of the telephone 14 will now occur only through the apparatus 16. It is to be noted that the resistance 42 will not interfere with normal conversation over the telephone line. If the user moves the switch 40 to the dotted line position shown in FIG. 1, which closes switch 40, the resistor 42 will be by-passed and the telephone line will function in a normal manner to be used to activate the receiver 14.

Figure 2:
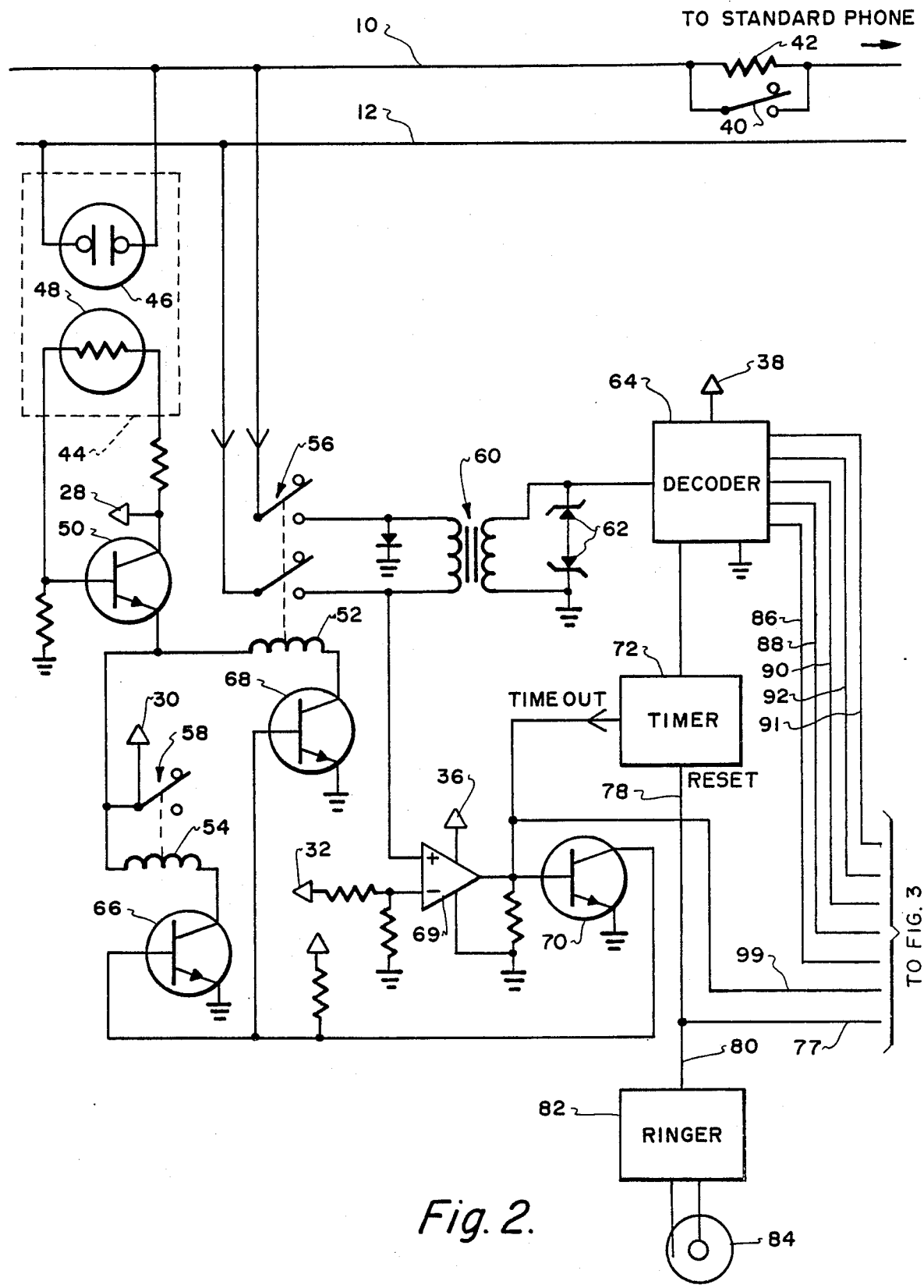
FIG. 2 is an electrical circuit diagram of the receiving and timer portions of the present invention.

Referring particularly to FIG. 2 there is shown a signal detector circuit 44. Detector circuit 44 is known generally as a photomodule and is composed of a neon tube 46 and a cadmium sulfide cell 48. The neon tube 46 is electrically connected between the conductors 10 and 12. Upon the conducting of a ringing signal through the conductors 10 and 12, the neon tube 46 is caused to glow which in turn affects the cadmium sulfide cell in a manner to lower its electrical resistance. This lowering of the resistance activates transistor 50.

Activation of transistor 50 energizes coils 52 and 54. Coil 52 closes double pole, double throw switch 56. Coil 54 closes single pole, single throw switch 58. Activation of the double throw switch 56 causes a one thousand ohm load, in the form of transformer 60, to be connected across the telephone line composed of conductors 10 and 12. The telephone equipment providing the ringing signal through the conductors 10 and 12 senses that the telephone receiver has been taken to an "off-hook" condition, in other words, placed in a state ready to engage in conversation across the telephone line. Therefore, in essence the transformer 60 coupled with the switch 56 functions as an off-hook simulating circuit. Connected across the secondary side of transformer 60 are two zener diodes 62. The function of the zener diodes 62 is to act as a voltage clamp to protect decoder 64 from excessive voltages. The function of the decoder 64 will be explained further on in this specification.

Closing of switch 58 connects a telephone receiver monitoring circuit in conjunction with the telephone line. This telephone receiver monitoring circuit includes transistor 66 which is turned on when the switch 58 is closed. Transistor 68 is also activated which results in activation of amplifier 69. If at this particular time the telephone receiver was moved to an off-hook condition, there would be a slight drop in the voltage within the telephone line conductors 10 and 12. This picking up of the receiver might possibly occur by accident if the user picked up the receiver during the time that it is required to place the calling party through the apparatus 16. This slight drop in the line voltage causes the output of amplifier 69 to go high turning on transistor 70. This turning on of transistor 70 causes transistors 66 and 68 to turn off thereby de-energizing switches 56 and 58. As a result the apparatus 16 is disconnected from the conductors 10 and 12 and normal conversation can occur through the telephone line.

It is to be understood that when discussing the "off-hook" condition of the telephone receiver 14 that generally the hand held receiver portion of the telephone receiver 14 must be removed from the body portion of the telephone receiver thereby moving the telephone receiver to an off-hook condition. The same end result can occur if a button is pushed and the telephone receiver moves into a mode of a speaker phone. It is to be understood that the term "off-hook" is to be inclusive in any way to activate the telephone receiver 14.

When a calling signal is being transmitted by the telephone line and the telephone receiver is in an "on-hook" position, it is thus apparent by what has been previously discussed that the output of transformer 60 is supplied to a dual tone multi-frequency decoder 64. The binary decimal output from decoder 64 activates a timer 72. The timer 72 is known as a "one shot" timer in that, once it receives an input signal (such as a low signal), the output of the timer 72 goes high for a period of time that is determined by an external resistor and capacitor. A typical time period would be five seconds. A common type of timer is what is referred to as a 555 Timer. If the time period expires, the output of the timer activates resistor 70 and deactivates transistors 66 and 68 which de-energizes and decouples the apparatus from the telephone line thereby in essence hanging up the telephone receiver.

Figure 3:
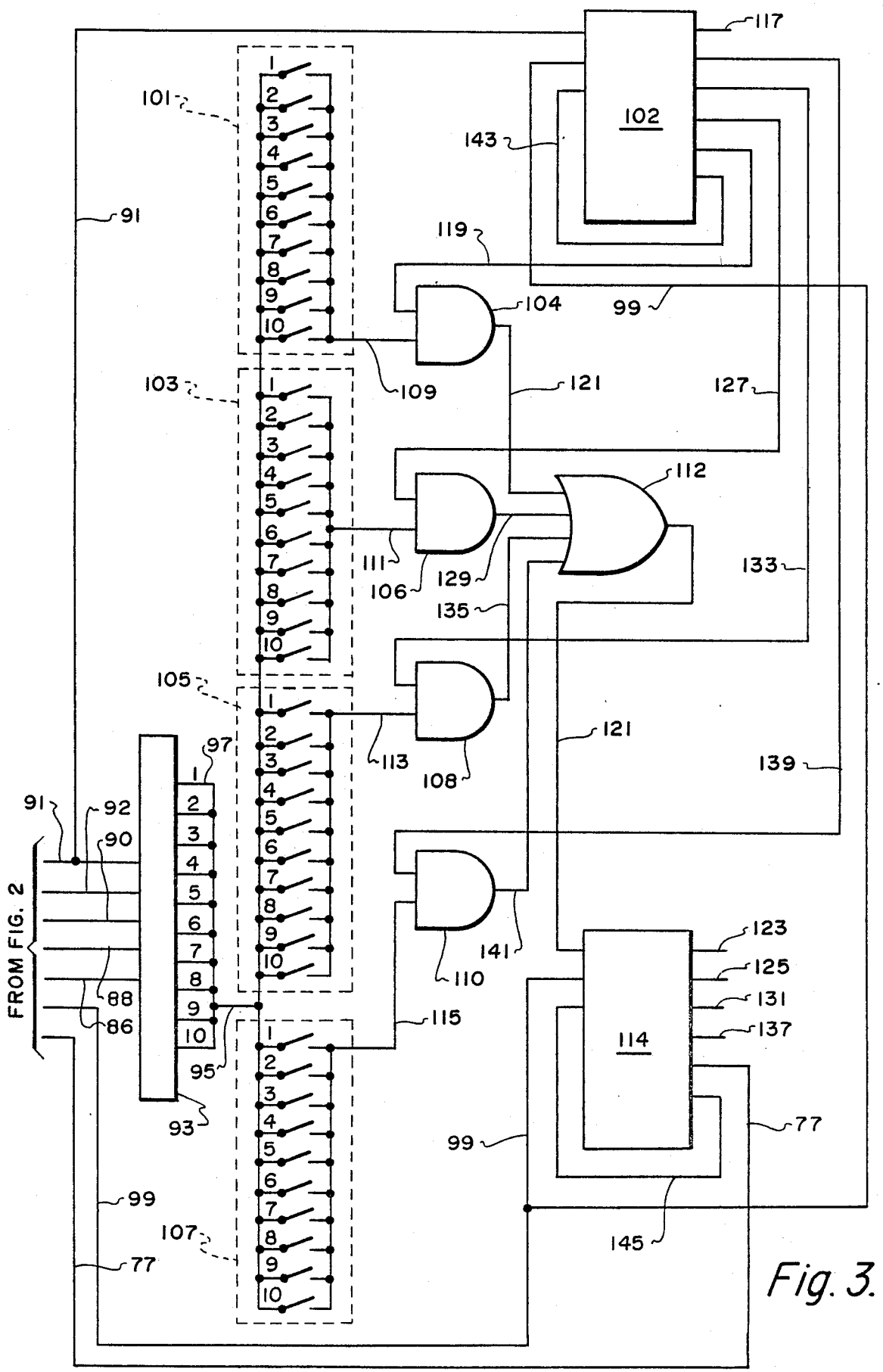
FIG. 3 is an electrical diagram of the comparator circuit utilized in conjunction with the apparatus of the present invention.

If the decoder 64 receives a predetermined additional signal, such as four additional numbers which have been supplied over the telephone lines 10 and 12 and have been inserted by the caller over the caller's telephone dialing mechanism, this additional code is transmitted to a comparator circuit shown in FIG. 3. The basic function of the comparator circuit is to match the four digit additional input signal from the decoder 64 against a previously applied input signal. This previously applied input signal is manually inserted into switch assemblies 101, 103, 105 and 107. The switch assemblies 101, 103, 105 and 107 are identical and each include a series of ten individually operable switches. Within switch assembly 101, one of the switches is to be manually closed such as switch two. Similarly, one of the switches within switch assembly 103 is closed such as switch seven. Again, in a similar manner, one of the switches within switch assembly 105 is closed such as switch nine. And still further, one of the switches within switch assembly 107 is closed such as switch four. This is a particular code (2,7,9,4) that must be input by a caller in order for the phone 14 to ring.

The output of the decoder 64 is conducted to lines 86, 88, 90 and 92 which are to be used to supply signals through a four to sixteen line decoder 93. Line 92 transmits a signal corresponding to number 2. Line 90 transmits a signal corresponding to number 7. Line 88 transmits a signal corresponding to number 9. Line 86 transmits a signal corresponding to number 4. Each signal is transmitted, one at a time, through a bus 97 to an output line 95. Line 95 is a grouping of the individual ten separate wires of bus 97. Each of the lines within the output line 95 is connected to the input side of the switch assemblies 101, 103, 105 and 107 on a one to one basis. For example, the line for numeral 1 of bus 97 can only connect with switch 1 of switch assemblies 101, 103, 105 and 107. As previously mentioned, if the input signal is "2,7,9,4" with switch assembly 101 being set to two, then the appropriate signal from line 95, corresponding to 2, will be required in order for an output signal to be conducted from switch assembly 101 into line 109. In a similar manner, the number 7 switch within switch assembly 103 will be closed and an appropriate corresponding signal from line 95 would be required in order to transmit an output signal into line 111. A similar arrangement will be required for switch assembly 105 into output line 113 and from switch assembly 107 into output line 115.

The signal within line 109 is transmitted to an AND gate 104, the signal 111 being transmitted to AND gate 106, signal 113 being transmitted to AND gate 108 and signal within line 115 being transmitted to AND gate 110. The line 91, from the decoder 64, will transmit a signal to counter 102 only when decoder 64 has valid data present. Initially, the counter 102 is set to supply an output to the zero line 117. Upon a valid signal being received from line 91, the counter incrementally moves from the zero line 117 an increment to produce an output signal within line 119. This produces a high signal to the AND gate 104. If the correct number is being supplied to switch assembly 102, which is number two, we now have two in number of high signals transmitted to the input side of the AND gate 104. This means that an output signal is then conducted from the AND gate 104 through line 121 to the OR gate 112. From the OR gate 112 a signal is output through line 121 to counter 114. This causes the counter 114 to move incrementally from the zero line position 123 to disconnected line 125.

From line 119, a counter 102 increments to line 127 as long as a valid data signal is being transmitted through line 91. If a valid signal is being supplied, and this number is 7 in the example being shown, a high output signal is being produced in line 111 with there also being a high signal produced within line 127. As a result, the AND gate 106 produces an output signal within line 129 which again supplies such to the OR gate 112 which in turn produces an appropriate signal within line 121. As a result, the counter 114 is incremented from disconnected line 125 to disconnected line 131.

Again in a similar manner, counter 102 is incremented to line 133 which transmits a high signal to AND gate 108. With the high signal being received by the AND gate 108 from line 113, an appropriate high output signal is produced within line 135 to the OR gate 112. Again, a high signal is produced within line 121 which increments the counter 114 from disconnected line 131 to disconnected line 137.

Still further, with valid data being presented, counter 102 is incremented from line 133 to line 139 which supplies a high signal to AND gate 110. With the valid numerical value of 4 being transmitted to switching assembly 107, a high signal is produced within line 115 to the AND gate 110. This produces an appropriate output signal within line 141 to the OR gate 112 which again produces an output signal within line 121 to the counter 114. As a result, the counter 114 is incremented from disconnected line 137 to line 77. This output signal is in turn transmitted by line 78 to the timer 72 and also transmitted by line 80 to an electronic ringer circuit 82. The signal from line 78 resets the timer 72 thereby disallowing the timer 72 from decoupling the apparatus 10 from the telephone line. It is to be noted that if no match occurs within the comparator circuit, there is no signal being transmitted into line 77 and hence into lines 78 and 80. As a result, not only will electronic ringer circuit 82 not be activated, but also the timer 72 will not be reset. As a result, after the predetermined time interval of the timer 72, the apparatus 10 of this invention will be disconnected from the telephone line in a manner as previously discussed. It is to be understood that the switching assemblies 101, 103, 105 and 107 can be used by the user to change the input code.

From line 139, the counter 102 is incremented to line 143. Line 143 connects back to the reset side of the counter 102 which resets the counter back to the zero line position 117. In a similar manner, incremental movement of the counter 114 from line 77 to line 145 will reset the counter 114 back to the zero line position 123.

A typical example for a ringer circuit 82 is circuit TCM1506 manufactured by Texas Instruments. The output from the ringer circuit 82 is to operate a piezo transducer 84 which produces an audible output signal. If the transducer 84 generates this output signal, it is now known that the correct additional signal has been transmitted through the telephone line and therefore the individual receiving the telephone call can move the telephone receiver 14 to an off-hook condition and know that the person calling is one authorized to make that call and the receiving party is not receiving an undesirable telephone call.

The actual construction of the counters 102 and 114 is deemed to be conventional and readily acquirable from any one of several different manufacturers. One particular manufacturer would be a Motorola part number M14017.

What is claimed is:

1. In combination with a telephone receiver and the telephone circuit permitting activation of said telephone receiver only upon the incoming telephone signal including a preselected additional code, the improvement comprising an apparatus including:

a signal detector circuit coupled to said telephone circuit, said signal detector circuit for receiving said telephone signal;

an off-hook simulating circuit coupled to said signal detector circuit, said off-hook simulating circuit giving the appearance to the source of said telephone signal that said telephone receiver has been moved to an off-hook condition;

a telephone receiver monitoring circuit for decoupling said apparatus from said telephone circuit upon said telephone receiver being moved to said off-hook condition, said telephone receiver monitoring circuit being coupled to said telephone circuit;

a timer circuit coupled to said telephone circuit and said signal detector circuit, said timer circuit being preset to a certain time interval;

a numerical data decoder circuit coupled to said timer circuit, said numerical data decoder circuit to produce an output signal corresponding to an additional signal transmitted over said telephone circuit;

a comparator circuit coupled to said decoder circuit, said comparator circuit containing a previously supplied input signal, said comparator circuit for receiving said output signal and matching such with said previously supplied input signal, if said output signal does not match said previously supplied input signal within said certain time interval said timer circuit de-energizes said apparatus and decouples said apparatus from said telephone circuit, said comparator circuit including a pair of counters with AND gates coupled between said counters; and a ringing circuit coupled to said comparator circuit and said telephone circuit, if said output signal matches said previously supplied input signal within said certain time interval said ringing circuit is activated encouraging a person to move said telephone receiver to said off-hook position.

2. The combination as defined in claim 1 wherein:
said comparator circuit including an OR gate, said OR gate coupled between said AND gates and one of said counters.

3. The combination as defined in claim 2 wherein:
said output signal resetting said timer circuit simultaneously with activating of said ringing circuit.

4. The combination as defined in claim 3 wherein:
said signal detector circuit including a photomodule.

5. The combination as defined in claim 4 wherein:
said off-hook simulating circuit including a transformer.

6. The combination as defined in claim 5 wherein:
said output of said numerical data decoder circuit comprising a binary decimal signal.

* * * * *